Jan. 13, 1942.  C. JACKSON  2,269,938
IMPLEMENT FOR TREATING CONCRETE AND LIKE PLASTIC MATERIALS
Filed April 1, 1940
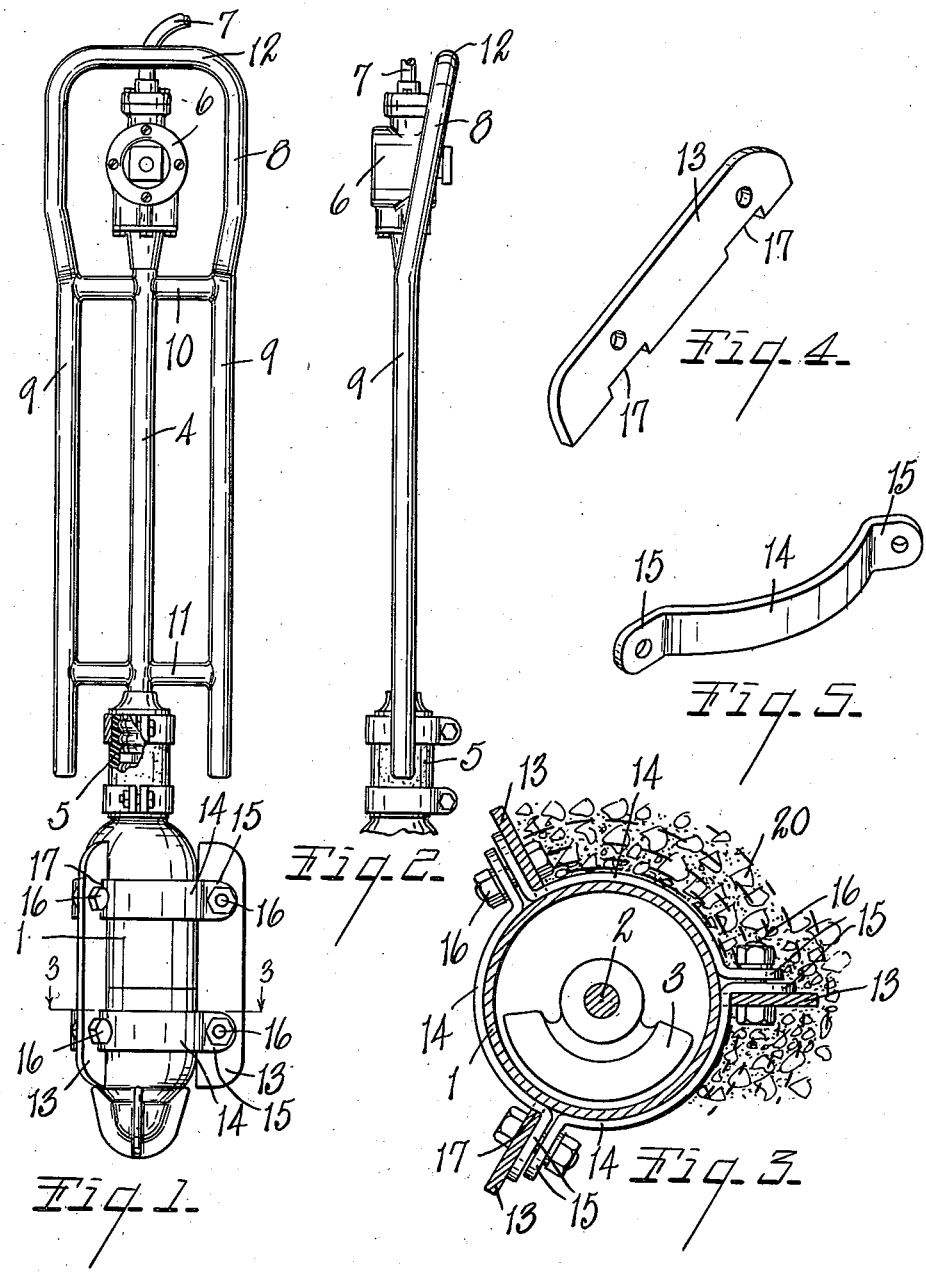
INVENTOR.
Corwill Jackson
BY Earl F Chappell
ATTORNEYS Patented Jan. 13, 1942

2,269,938

UNITED STATES PATENT OFFICE 2,269,938

IMPLEMENT FOR TREATING CONCRETE AND LIKE PLASTIC MATERIALS

Corwill Jackson, Ludington, Mich.

Application April 1, 1940, Serial No. 327,223

3 Claims. (Cl. 25—1)

This invention relates to improvements in implements for treating concrete and like plastic materials.

The main objects of this invention are:

First, to provide an apparatus for treating concrete and like materials for bulk placement in situ which is highly efficient and capable of manipulation to meet varying conditions in the placement of concrete and the like.

Second, to provide a hand or manually operated implement which is capable of very wide range of manipulation without excessive effort on the part of the operator.

Third, to provide an apparatus which is effective for the placement of concrete of low water content.

Objects relating to details and economies of the invention will appear from the description to follow. The invention is defined and pointed out in the claims.

A preferred embodiment of the invention is illustrated in the accompanying drawing, in which:

Fig. 1 is a front elevation of an implement embodying the features of my invention, portions being broken away to show structure and for convenience in illustration.

Fig. 2 is a fragmentary side elevation looking from the left of Fig. 1.

Fig. 3 is a horizontal section on line 3—3 of Fig. 1.

Fig. 4 is a perspective view of one of the longitudinal pocket forming blades.

Fig. 5 is a perspective view of one of the clamp elements.

My improved implement comprises an elongated casing or housing member 1 preferably cylindrical and adapted to constitute a housing for an electric motor, the rotor switch of which is indicated at 2. This rotor is provided with an unbalancing weight 3 so that when the rotor is driven at high frequency, high frequency vibrations are imparted to the casing.

The casing is adapted to be submerged in concrete or other material to be treated and is provided with a handle comprising a shank 4 which is connected to the casing by the flexible coupling 5 which provides a resilient shock absorbing connection for the handle.

The shank 4 has a control box 6 mounted on its upper end—in the case of an electric motor this being a switch box, and the electrical conduit being indicated at 7.

The handle comprises a yoke-like grip member designated generally by the numeral 8, the arms 9 of which are disposed in parallel relation to the shank 4 and connected to the cross arms 10 and 11 on the shank, the cross arm 11 being close to the lower end of the shank and the cross arm 10 adjacent the control box. The bight portion 12 is disposed outwardly and embraces the control box. This bight portion is preferably offset forwardly as shown in Fig. 2 which brings it into convenient position for grasping. The arms 9 and the cross piece 10 are also adapted for grasping or as handholds so that the operator may grasp the handle at a number of different positions which is desirable for various situations in using the implement. The implement is a large capacity implement and is designed to be manipulated by two workmen.

The casing is provided with radial blades 13 preferably detachably secured thereto as shown in Figs. 1 and 3 in which the blades are secured by means of the segmental clamp members 14 terminating in radially disposed ears 15, the blades being arranged at one side of the pair of ears and secured thereto and the clamps clamped around the casing by means of bolts 16. When thus arranged, the blades are notched at 17 to receive the clamp members.

In the embodiment shown in Figs. 1 and 3, three blades are illustrated but more may be provided if desired.

The implement is designed to be submerged in a mass of material to be treated as indicated at 20. The blades are preferably approximately the length of the casing and of such width as to form pockets between them which receive the material being treated and confine it in a measure to effectively receive the vibrations.

The rotor is driven at high frequency so that high frequency vibrations are set up and in a generally orbital path. There is a considerable tendency for the tool or implement to twist or turn under the action of the unbalanced rotor and these blades also serve to minimize that action, the present structure being a substantial improvement in that respect over the structure of my Patent 1,497,941 which had blades on the lower end of the housing acting to counteract the tendency to twist or turn to some extent.

However, the blades of my improvements serve that function and also the primary function of effectively imparting vibrations to the material treated and in supporting it so that it effectively receives the vibrations.

The blades are subject to a very considerable wear in use and the mounting I provide for the blades not only has the advantage of being economical from the structural standpoint but it permits renewal of the blades as occasion may render desirable.

I have illustrated and described my improvements in a very satisfactory commercial embodiment. I have not attempted to illustrate other embodiments which I contemplate as it is believed that this disclosure will enable those skilled in the art to embody or adapt my invention as may be desired.

Having thus described my invention, what I claim as new and desire to secure by Letters Patent is:

1. An implement of the class described comprising an elongated cylindrical motor casing adapted to be submerged in a mass of material to be treated, a motor housed in said casing and provided with a rotor having an unbalancing weight, a plurality of external blades disposed longitudinally and radially of said casing and extending approximately the full length thereof and being of substantial width, so as to project substantially beyond the outer periphery of the casing, and complementary segmental band-like clamp members terminating in radially disposed ears, said blades being disposed on one side of the pair of ears and secured thereto by bolts through the ears and blades, the blades being notched at their inner ends to receive said clamp members, and a handle resiliently connected to said casing in axial alignment with the axis of said rotor.

2. An implement of the class described comprising an elongated cylindrical motor casing adapted to be submerged in a mass of material to be treated, a motor housed in said casing and provided with a rotor having an unbalancing weight, a plurality of external blades disposed longitudinally and radially of said casing and extending approximately the full length thereof and being of substantial width, so as to project substantially beyond the outer periphery of the casing, and complementary segmental band-like clamp members for detachably securing said blades to said casing, and a handle resiliently connected to said casing in axial alignment with the axis of said rotor.

3. An implement of the class described comprising an elongated rotor casing adapted to be submerged in a mass of material to be treated, an unbalanced rotor, a plurality of external blades disposed longitudinally and radially of said casing and extending approximately the full length thereof and being of substantial width, so as to project substantially beyond the outer periphery of the casing, and complementary segmental band-like clamp members terminating in radially disposed ears, said blades being clamped to said ears by bolts through the ears and blades, and a handle resiliently connected to said casing in axial alignment with the axis of said rotor.

CORWILL JACKSON.